(12) United States Patent
Hausmann et al.

(10) Patent No.: US 9,783,352 B2
(45) Date of Patent: Oct. 10, 2017

(54) MULTILAYER FILM COMPRISING CYCLIC OLEFIN COPOLYMER

(71) Applicant: E I DU PONT DE NEMOURS AND COMPANY, Wilmington, DE (US)

(72) Inventors: Karlheinz Hausmann, Auvernier (CH); Yves M Trouilhet, Vesenaz (CH)

(73) Assignee: E.I. DU PONT DE NEMOURS AND COMPANY, Wilmington, DE (US)

( * ) Notice: Subject to any disclaimer, the term of this patent is extended or adjusted under 35 U.S.C. 154(b) by 327 days.

(21) Appl. No.: 14/375,144

(22) PCT Filed: Jan. 31, 2013

(86) PCT No.: PCT/US2013/024022
§ 371 (c)(1),
(2) Date: Jul. 29, 2014

(87) PCT Pub. No.: WO2013/116445
PCT Pub. Date: Aug. 8, 2013

(65) Prior Publication Data
US 2014/0370278 A1    Dec. 18, 2014

Related U.S. Application Data

(60) Provisional application No. 61/592,870, filed on Jan. 31, 2012, provisional application No. 61/592,884, filed on Jan. 31, 2012.

(51) Int. Cl.
| | |
|---|---|
| *B29C 47/06* | (2006.01) |
| *B32B 27/32* | (2006.01) |
| *B65D 65/40* | (2006.01) |
| *B32B 27/08* | (2006.01) |
| *B32B 7/12* | (2006.01) |
| *B29C 47/00* | (2006.01) |
| *B29C 47/88* | (2006.01) |
| *B29C 55/28* | (2006.01) |
| *B29C 55/02* | (2006.01) |
| *B32B 27/30* | (2006.01) |
| *B32B 27/34* | (2006.01) |
| *B29C 47/34* | (2006.01) |
| *B29K 96/00* | (2006.01) |
| *B29K 23/00* | (2006.01) |
| *B29K 29/00* | (2006.01) |
| *B29K 77/00* | (2006.01) |
| *B32B 37/15* | (2006.01) |
| *B29L 9/00* | (2006.01) |
| *B29K 105/00* | (2006.01) |
| *B29L 23/00* | (2006.01) |
| *B29L 31/00* | (2006.01) |

(52) U.S. Cl.
CPC .......... *B65D 65/40* (2013.01); *B29C 47/0026* (2013.01); *B29C 47/065* (2013.01); *B29C 47/881* (2013.01); *B29C 47/8805* (2013.01); *B29C 47/8825* (2013.01); *B29C 47/8895* (2013.01); *B29C 55/023* (2013.01); *B29C 55/28* (2013.01); *B32B 7/12* (2013.01); *B32B 27/08* (2013.01); *B32B 27/32* (2013.01); *B32B 27/325* (2013.01); *B29C 47/0057* (2013.01); *B29C 47/34* (2013.01); *B29C 47/8835* (2013.01); *B29K 2023/06* (2013.01); *B29K 2023/0625* (2013.01); *B29K 2023/0633* (2013.01); *B29K 2023/08* (2013.01); *B29K 2023/086* (2013.01); *B29K 2023/12* (2013.01); *B29K 2023/14* (2013.01); *B29K 2023/38* (2013.01); *B29K 2029/04* (2013.01); *B29K 2077/00* (2013.01); *B29K 2096/005* (2013.01); *B29K 2105/0085* (2013.01); *B29L 2009/00* (2013.01); *B29L 2023/001* (2013.01); *B29L 2031/712* (2013.01); *B32B 27/306* (2013.01); *B32B 27/34* (2013.01); *B32B 37/153* (2013.01); *B32B 2307/31* (2013.01); *B32B 2307/516* (2013.01); *B32B 2307/518* (2013.01); *B32B 2307/5825* (2013.01); *B32B 2307/7242* (2013.01); *B32B 2439/70* (2013.01); *Y10T 428/2826* (2015.01)

(58) Field of Classification Search
CPC ..... B32B 27/34; B32B 27/306; B32B 27/325; B32B 2307/514; B32B 2307/516; B32B 2307/518; B32B 2307/31; B32B 2307/7242
USPC .......................................................... 428/349
See application file for complete search history.

(56) References Cited

U.S. PATENT DOCUMENTS

| | | | |
|---|---|---|---|
| 3,350,372 A | 10/1967 | Anspon et al. | |
| 3,404,134 A | 10/1968 | Rees | |
| 3,756,996 A | 9/1973 | Pugh et al. | |
| 5,028,674 A | 7/1991 | Hatch et al. | |
| 5,087,677 A | 2/1992 | Brekner et al. | |
| 5,278,272 A | 1/1994 | Lai et al. | |
| 5,371,158 A | 12/1994 | Brekner et al. | |
| 5,869,586 A | 2/1999 | Riedel et al. | |
| 6,068,936 A | 5/2000 | Peiffer et al. | |
| 6,316,560 B1 | 11/2001 | Jacobs et al. | |

(Continued)

FOREIGN PATENT DOCUMENTS

| | | |
|---|---|---|
| CN | 101875420 A | 11/2010 |
| DE | 109225 A1 | 10/1974 |

(Continued)

*Primary Examiner* — Marc Zimmer (57) ABSTRACT

Disclosed is a multilayer film structure, comprising, in order, a puncture resistant layer comprising at least one cyclic olefin copolymer (COC) and at least one ionomer or polyolefin, a tie layer and a sealant layer. The structure can be coextruded and can be prepared using a triple bubble process.

21 Claims, 1 Drawing Sheet

(56) References Cited

U.S. PATENT DOCUMENTS

| | | |
|---|---|---|
| 6,500,888 B2 | 12/2002 | Baumgartner et al. |
| 7,384,679 B2 * | 6/2008 | Blemberg .................. B32B 7/02 264/171.11 |
| 2002/0156195 A1 | 10/2002 | Hausmann |
| 2003/0157350 A1 | 8/2003 | Ueyama et al. |
| 2005/0175805 A1 | 8/2005 | Hild et al. |
| 2006/0046006 A1 | 3/2006 | Bastion et al. |
| 2007/0158019 A1 * | 7/2007 | Frisk ........................ B32B 27/08 156/272.6 |
| 2008/0095960 A1 * | 4/2008 | Schell ........................ B32B 7/10 428/34.8 |
| 2008/0311370 A1 * | 12/2008 | Tatarka .................. B32B 27/32 428/220 |
| 2009/0123611 A1 * | 5/2009 | Bekele ..................... B32B 7/12 426/106 |
| 2009/0285511 A1 * | 11/2009 | Aithani .............. B65D 75/5805 383/200 |
| 2010/0003432 A1 | 1/2010 | Schiffman |
| 2011/0091695 A1 * | 4/2011 | Bevilacqua ............. B29C 55/28 428/195.1 |
| 2012/0318698 A1 * | 12/2012 | Bekele .................... B32B 27/08 206/524.1 |
| 2014/0306056 A1 * | 10/2014 | Fischer .................... B32B 7/12 244/31 |

FOREIGN PATENT DOCUMENTS

| | | |
|---|---|---|
| EP | 0407870 A2 | 1/1991 |
| EP | 0485893 A1 | 5/1992 |
| EP | 0800914 A1 | 10/1997 |
| EP | 1423408 B1 | 4/2006 |
| EP | 1803552 A1 | 7/2007 |
| JP | 2004-330584 A | 11/2004 |
| JP | 2011-121628 A | 6/2011 |
| WO | 98/27126 A1 | 6/1998 |
| WO | 2004/024433 A2 | 3/2004 |
| WO | WO 2007/095667 A1 * | 8/2007 |
| WO | 2008/139028 A1 | 11/2008 |

* cited by examiner

MULTILAYER FILM COMPRISING CYCLIC OLEFIN COPOLYMER

This application is the national stage entry of the international application serial number PCT/US2013/024022, filed Jan. 31, 2013, which claims priority from U.S. Provisional Application Ser. No. 61/592,870, filed Jan. 31, 2012, and U.S. Provisional Application Ser. No. 61/592,884, filed Jan. 31, 2012.

The invention relates to a coextruded multilayer film structure comprising cyclic olefin copolymer that can be used in packaging such as in food packaging applications.

BACKGROUND OF THE INVENTION

In the field of packaging, both shrinkable and non-shrinkable multilayer films designed to hold goods must often fulfill multiple requirements.

For example, when packaging goods that have sharp edges or needle-like protrusions, it is important that the multilayer films used in the packaging of such goods have excellent puncture resistance.

A solution to such puncture resistance requirements can be provided by a multilayer film comprising a layer containing polyamide, or blends thereof. For example, EP1296830 describes a multilayer film comprising an intermediate layer of polyamide having good puncture resistance properties, suitable for packaging deep-frozen foods such as ribs and seafood such as crabs.

On the other hand, such multilayer films must also display other properties such as the tendency to shrink under the influence of heat and adopt the form of the packaged good, a property known as "heat shrink".

In most packaging applications such as shrink bags used for food and in particular for meat packaging, a "heat shrink" of at least 40% is required, but the inclusion of a polyamide layer to enhance puncture resistance generally also reduces the tendency of a multilayer film to shrink under heat, and so a compromise between these two desirable properties must be struck.

Ionomers are known for their excellent ability to shrink under heat, and depending on the degree of neutralization of the ionomer, the "heat shrink" of a multilayer film comprising a layer of ionomer can reach 50% and even higher values.

However, multilayer films comprising a layer of ionomer have only moderate puncture resistance compared to similar multilayer structures that contain stiffer components such as polyamide and are therefore not used extensively to package sharp or pointy edges such as meat cuts having salient bone fragments or splinters.

It is believed that blends of polyamide and ionomer would result in a polymeric material combining the puncture resistance of polyamide and to heat shrink performance of ionomers, but to a strongly diminished extent, making such compositions less desirable.

There exists the possibility to combine multiple layers in one film in order to produce a film combining the advantages of each of the individual layers, but since the economic cost of such a film increases with its complexity, this is not always advantageous. In many cases, multilayer films must be constructed by sequential lamination operations, which add expense. Furthermore, the inclusion of stiff polyamide layers in order to increase puncture resistance leads to complications from an environmental point of view, since the recycling of such structures is inherently problematic due to the chemical incompatibility between polyamides and polyolefins.

Therefore, there exists a need to provide a multilayer film that combines good puncture resistance and, more importantly high "heat shrink" properties in one layer, which can be manufactured at low economic cost, and which can be recycled more easily.

EP1423408 discloses sealant layers comprising blends of ionomers and cyclic olefin polymers having relatively good puncture resistance, but is silent on the heat shrink behavior of such blends in oriented multilayer films.

SUMMARY OF THE INVENTION

The above-mentioned problems are solved by a multilayer film structure, preferably coextruded instead of laminated, comprising, in order, at least one puncture resistant layer comprising at least one cyclic olefin copolymer and at least one ionomer or polyolefin; at least one tie layer; and at least one sealant layer; wherein the film is either monoaxially oriented or biaxially oriented and obtained by a triple bubble process; and the film structure has a puncture resistance of at least 2 J/mm, wherein the puncture resistance is measured according to DIN14477 at a speed of 1 mm/min using a rod bearing a spherical ball at its tip, the rod having a diameter of 2 mm and the spherical ball having a diameter of 2.5 mm.

The multilayer film structure is obtainable by, or obtained by, a triple bubble process, and may be either monoaxially oriented or biaxially oriented.

The triple bubble process allows the manufacturing of these structures in one step through coextrusion, rather than laminating a biaxially oriented outer film (e.g. polyester) to the layers containing COC blends with polyolefins or ionomers. This can significantly reduce the cost of the packaging film. Also in this case, the entire film is oriented rather than just selected layers, allowing for more consistent shrink properties.

The invention also provides a (triple bubble) process for manufacturing a coextruded multilayer film structure, comprising coextruding a multilayer film structure to a coextruded tubular film; cooling the coextruded multilayer tubular film structure in a first bubble; orienting the coextruded multilayer tubular film structure under heating in a second bubble to produce an oriented film; and relaxing the oriented film under heating in a third bubble; wherein the tubular multilayer film structure comprises at least one puncture resistant layer as characterized above. That is, the puncture resistant layer comprises at least one COC and at least one ionomer or polyolefin. In a preferred process, the oriented film is either mono-axially oriented or biaxially oriented.

Furthermore, the invention provides an article, in particular a packaging article, comprising the above-mentioned multilayer film structures.

DETAILED DESCRIPTION

The invention provides a multilayer film structure, preferably coextruded, comprising, in this order, at least one puncture resistant layer comprising at least one COC and at least one ionomer or polyolefin, at least one tie layer and at least one sealant layer.

A preferred multilayer film structure is one wherein the at least one puncture resistant layer comprises at least one cyclic olefin copolymer and at least one ionomer, at least one cyclic olefin copolymer and polyethylene, or at least one cyclic olefin copolymer and polypropylene, the tie layer comprises olefin homopolymers and/or copolymers, preferably polyethylene homopolymers or copolymers, propylene homopolymers or copolymers, or mixtures thereof, or ethylene copolymers, preferably ethylene α-olefin copolymers, ethylene vinyl acetate copolymers, ethylene alkyl (meth) acrylate copolymers, or polymers or copolymers modified with acid, anhydride or epoxide functionalities; and the sealant layer comprises olefin homopolymers and/or copolymers chosen among polyethylene, propylene homopolymers and copolymers, ethylene copolymers, preferably ethylene (meth)acrylic acid copolymers and their corresponding ionomers, and/or mixtures thereof.

Puncture resistance denotes the relative ability of a material to inhibit the progression of penetration of a sharp object once it has been pierced by it. Tests devised to measure puncture resistance are generally application-specific, covering items such as roofing, packing materials, protective garments, and needle-resistant materials. For example, a puncture resistant material can resist a specific pierce force per unit thickness, by a 25 gauge needle perpendicular to the material, between 0.1 to 150 N/mm, 0.1 to 100 N/mm, 1 to 50 N/mm, 1 to 20 N/mm, or 1 to 10 N/mm, 50 to 150 N/mm, 50 to 100 N/mm, or in form of a specific energy per unit thickness in J/mm. Typically it can be from 0.1 to 20 or from 1 to 10 J/mm.

The puncture resistance can be measured according to a DIN14477 or EN388 test at a speed of 1 mm/min using a rod bearing a spherical ball at its tip, the rod having a diameter of 2 mm and the spherical ball having a diameter of 2.5 mm. Preferably, films as described herein have puncture resistance in this test of at least 2 J/mm, such as from 2 to 10 J/mm, preferably from 3 to 8 J/mm.

The puncture resistant layer of the multilayer film structures comprises at least one COC and at least one ionomer or polyolefin. Preferably, the puncture resistant layer of the coextruded multilayer film structure may be essentially free of polyamides such as for example semi-crystalline and amorphous polyamides, i.e. the puncture resistant layer of the coextruded multilayer film structure may not comprise a polyamide, such as for example semi-crystalline and amorphous polyamides.

The puncture resistant layer may comprise from 10 to 99, 10 to 40, to 30, 40 to 95, 55 to 95, or 60 to 95 weight % of the COC, based on the total weight of the puncture resistant layer.

COC includes copolymers of unsaturated cyclic monomers, and may be obtained by either chain polymerization of one or more unsaturated cyclic monomers with one or more unsaturated linear monomer such as for example ethylene, or may be obtained by ring-opening metathesis of one or more unsaturated cyclic monomers and subsequent hydrogenation.

Examples of unsaturated cyclic monomers may be chosen from, without limitation, norbornene and derivatives thereof such as for example 2-norbornene, 5-methyl-2-norbornene, 5,5-dimethyl-2-norbornene, 5-butyl-2-norbornene, 5-ethylidene-2-norbornene, 5-methoxycarbonyl-2-norbornene, 5-cyano-2-norbornene, 5-methyl-5-methoxycarbonyl-2-norbornene, and 5-phenyl-2-norbornene; cyclopentadiene and derivatives thereof such as for example dicyclopentadiene and 2,3-dihydrocyclopentadiene; and combinations of two or more thereof.

Examples of unsaturated linear monomer may be chosen, without limitation, from alkenes having 1 to 20, preferably from 1 to 12 carbon atoms, most preferably from 1 to 6 carbon atoms, such as for example alpha-olefins, for example ethylene, propylene, and butylene. Other unsaturated linear monomers may be chosen from 1-butene, 4-methyl-1-pentene, 1-hexene, 1-octene, 1-decene, 1-dodecene, 1-tetradecene, 1-hexadecene, 1-octadecene and 1-eicocene, cyclopentene, cyclohexane, 3-methylcyclohexene, cyclooctene, 1,4-hexadiene, 4-methyl-1,4-hexadiene, 5-methyl-1,4-hexadiene, 1,7-octadiene, dicyclopentadiene, 5-ethylidene-2-norbornene, 5-vinyl-2-norbornene, tetracyclododecene, 2-methyltetracyclododecene, and 2-ethyltetracyclododecene; or combinations of two or more thereof. Preferably the unsaturated linear monomer is ethylene.

Examples of COC obtained by chain polymerization of one or more unsaturated cyclic monomers with one or more unsaturated linear monomer can include copolymers of ethylene and norbornene, ethylene to and tetracyclododecene.

COC polymers are generally, or even completely, amorphous, highly transparent and have very high moisture barrier properties, roughly twice that of HDPE and five times that of LDPE. COC may be chosen among cyclic olefin copolymers having a glass transition temperature (Tg) of from 60 to 150° C. or from 70 to 100° C.

Examples of COC obtained by ring-opening metathesis of one or more unsaturated cyclic monomers and subsequent hydrogenation can include hydrogenated polynorbornene.

The COC may be chosen from cyclic olefin copolymers having at least 15, from 15 to 90, or from 15 to 40 mole percent of unsaturated cyclic monomers.

The cycloolefin polymers can be prepared with the aid of transition-metal catalysts. Preparation processes are described, for example, in DD-A-109 225, EP-A-0 407 870, EP-A-0 485 893, U.S. Pat. Nos. 5,869,586 and 6,068,936, and WO98/27126. Molecular weight regulation during the preparation can advantageously be effected using hydrogen. Suitable molecular weights can also be established through targeted selection of the catalyst and reaction conditions. Details in this respect are given in the above mentioned specifications.

Suitable cycloolefin polymers are the products sold under the trademark Topas® by Ticona.

The puncture resistant layer may also comprise an ionomer based on an E/X/Y acid copolymer where E is ethylene, X is a $C_3$ to $C_8$ α,β-ethylenically unsaturated carboxylic acid, and Y is an optional comonomer selected from alkyl acrylate and alkyl methacrylate.

Suitable $C_3$ to $C_8$ α,β-ethylenically unsaturated carboxylic acids may be chosen, for example, among methacrylic acid and acrylic acid. The $C_3$ to $C_8$ α,β-ethylenically unsaturated carboxylic acid may be present in an amount from 2 to 30, 5 to 20, or 12 to 19 weight percent, based on the total weight of the acid copolymer.

The optional comonomer Y may be present in an amount from 0.1 to 40, 0.1 to 10 weight %, based on the weight of the E/X/Y copolymer, or to not present at all.

To form the ionomer, the carboxylic acid functionalities present in the E/X/Y copolymer can be at least partially neutralized to salts containing one or more alkali metal, transition metal, or alkaline earth metal cations such as for example sodium, zinc, lithium, magnesium, or calcium.

Thus, an ionomer may be chosen among E/X copolymers where E is ethylene and X is methacrylic acid at least partially neutralized by zinc or sodium.

Suitable polymers for use in the present invention are the ionomers commercially available under the trademark Surlyn® from E. I. du Pont de Nemours and Company (DuPont). Example ionomers include a copolymer of ethylene with 15% methacrylic acid and a melt flow index (MFI) of 0.7, 58% neutralized with Zn, and a copolymer of ethylene, with 10% methacrylic acid and MFI of 1.5, 38% neutralized with Zn.

The puncture resistant layer may also comprise a polyolefin chosen among polyethylene homopolymers, polyethylene copolymers, polypropylene homopolymers or polypropylene copolymers and/or mixtures thereof.

Non-limiting examples of polyethylene homopolymers and/or copolymers (wherein ethylene is the major comonomer) suitable for use as a component of the puncture resistant layer or in tie layers (described further below) in the coextruded multilayer film structure are, for example, ultra low density polyethylene (ULDPE), very low density polyethylene (VLDPE), low density polyethylene (LDPE), linear low density polyethylene (LLPE), high density polyethylene (HDPE) or metallocene polyethylene (mPE).

Polyethylene homopolymers and/or copolymers may be made by any available process known in the art including high pressure gas, low pressure gas, solution and slurry processes employing conventional Ziegler-Natta, metallocene, and late transition metal complex catalyst systems.

Polypropylene homopolymers and/or copolymers such as random copolymers, block copolymers and terpolymers of propylene include to copolymers of propylene (wherein propylene is the major comonomer) with other olefins such as ethylene, 1-butene, 2-butene and the various pentene isomers, and terpolymers of propylene such as copolymers of propylene with ethylene and one other olefin, and random copolymers (statistical copolymers) that have propylene and the comonomer(s) randomly distributed throughout the polymeric chain in ratios corresponding to the feed ratio of the propylene to the comonomer(s). Suitable block copolymers are made up of chain segments consisting of propylene homopolymer and of chain segments consisting of, for example, random copolymers of propylene and ethylene.

Polypropylene homopolymers and/or copolymers can be manufactured by any known process (e.g., using Ziegler-Natta catalyst, based on organometallic compounds or on solids containing titanium trichloride). Block copolymers can be manufactured similarly, except that propylene is generally first polymerized by itself in a first stage and propylene and additional comonomers such as ethylene are then polymerized, in a second stage, in the presence of the polymer obtained during the first. Because the processes for making polypropylenes are well known to one skilled in the art, the description thereof is omitted herein for the interest of brevity.

The thickness of the puncture resistant layer may depend on the specific end-use of the coextruded multilayer film structure and can range from 5 to 60 μm or from 10 to 30 μm. The thickness of the puncture resistant layer may range from 5 to 90%, 10 to 70%, or 20 to 50%, of the total thickness of the coextruded multilayer film structure.

The coextruded multilayer film structure comprises at least one tie layer. The tie layer serves to adhere the puncture resistant layer to a sealant layer and/or other adjacent layers. In the case where the tie layer serves to adhere the at least one puncture resistant layer to the at least one sealant layer, the tie layer is adjacent to at least one sealant layer and the puncture resistant layer. Stated alternatively, the tie layer is sandwiched between the puncture resistant layer and the sealant layer.

The tie layer may comprise one or more olefin homopolymers and/or copolymers, as described above. Preferably, the one or more to olefin homopolymers and/or copolymers are chosen among polyethylene homopolymers and/or copolymers, propylene homopolymers and/or copolymers, and/or mixtures thereof.

A noted tie layer comprises one or more ethylene copolymers.

"Ethylene copolymer" refers to a polymer comprising repeat units derived from ethylene and at least one additional monomer. The additional monomer may be another α-olefin, or a monomer with a polar functional group.

The ethylene copolymers may be chosen among ethylene α-olefin copolymers, ethylene vinyl acetate copolymers, ethylene alkyl (meth)acrylate copolymers such as ethylene methyl (meth)acrylate copolymers, ethylene ethyl (meth)acrylate copolymers, ethylene butyl (meth)acrylate copolymers, or combinations of two or more thereof.

"Alkyl (meth)acrylate" refers to alkyl acrylate and/or alkyl methacrylate.

In the case where the tie layer comprises an ethylene copolymer, the ethylene copolymer can be an ethylene α-olefin copolymer which comprises ethylene and an α-olefin of 3 to 20 or 4 to 8 carbon atoms.

The density of the ethylene α-olefin copolymers can range from 0.860 g/cm$^3$ to 0.925 g/cm$^3$, from 0.860 g/cm$^3$ to 0.91 g/cm$^3$, or between 0.880 g/cm$^3$ to 0.905 g/cm$^3$. Resins made by Ziegler-Natta type catalysis and by metallocene or single site catalysis are included provided they fall within the density ranges so described. The metallocene or single site resins useful herein are (i) those which have an I-10/I-2 ratio of less than 5.63 and an Mw/Mn (polydispersivity) of greater than (I-10/I-2)−4.63, and (ii) those based which have an I-10/I-2 ratio of equal to or greater than 5.63 and a polydispersivity equal to or less than (I-10/I-2)−4.63. The metallocene resins of group (ii) may have a polydispersivity of greater than 1.5 but less than or equal to (I-10/I-2)−4.63. Conditions and catalysts which can produce substantially linear metallocene resins are described in U.S. Pat. No. 5,278,272. The reference gives full descriptions of the measurement of the well-known rheological parameters I-10 and I-2, which are flow values under different load and hence shear conditions. It also provides details of measurements of the well-known Mw/Mn ratio to determination, as determined by gel-permeation chromatography (GPC).

The ethylene copolymers may be ethylene copolymerized with a monomer comprising a polar functional group such as vinyl acetate or alkyl (meth)acrylates.

When the tie layer comprises an ethylene vinyl acetate copolymer, the relative amount of copolymerized vinyl acetate units may be of from 2 to 40, 10 to 40, 10 to 30, or 15 to 28, weight %, based on the total weight of the ethylene vinyl acetate copolymer. A mixture of two or more different ethylene vinyl acetate copolymers may be used as components of the tie layer in place of a single copolymer.

Ethylene alkyl (meth)acrylate copolymers are thermoplastic ethylene copolymers derived from the copolymerization of ethylene comonomer and at least one alkyl (meth)acrylate comonomer, wherein the alkyl group contains from one to ten carbon atoms and preferably from one to four carbon atoms.

When the tie layer comprises an ethylene alkyl (meth)acrylate copolymer, the relative amount of copolymerized alkyl (meth)acrylate units may be of from 0.1 to 45, 5 to 35, or 8 to 28 weight percent, based on the total weight of the ethylene alkyl (meth)acrylate copolymer. An example ethylene alkyl (meth)acrylate copolymer is a copolymer of ethylene and 16% ethyl acrylate, melt flow index (MFI) of 1.

The olefin homopolymers and/or ethylene copolymers may be modified copolymers, meaning that the copolymers are grafted and/or copolymerized with organic functionalities. Modified polymers for use in the tie layer may be modified with acid, anhydride and/or epoxide functionalities. Examples of the acids and anhydrides used to modify polymers, which may be mono-, di- or polycarboxylic acids are acrylic acid, methacrylic acid, maleic acid, maleic acid monoethylester, fumaric acid, itaconic acid, crotonic acid, itaconic anhydride, maleic anhydride and substituted maleic anhydride, e.g. dimethyl maleic anhydride or citrotonic anhydride, nadic anhydride, nadic methyl anhydride, and tetrahydrophthalic anhydride, or combinations of two or more thereof, maleic anhydride being preferred.

Where the olefin homopolymer and/or copolymer is acid-modified, it to may contain from 0.05 to 25 weight percent of an acid, based on the total weight of the modified polymer.

When anhydride-modified polymer is used, it may contain from 0.03 to 10, or 0.05 to 5 weight percent of an anhydride, based on the total weight of the modified polymer.

Examples of epoxides used to modify polymers can include unsaturated epoxides comprising from four to eleven carbon atoms, such as glycidyl (meth)acrylate, allyl glycidyl ether, vinyl glycidyl ether and glycidyl itaconate, glycidyl (meth)acrylates being particularly preferred.

Epoxide-modified ethylene copolymers may contain from 0.05 to 15 weight % of an epoxide, based on the total weight of the modified ethylene copolymer. Epoxides used to modify ethylene copolymers can include glycidyl (meth)acrylates. An ethylene/glycidyl (meth)acrylate copolymer may further contain copolymerized units of an alkyl (meth)acrylate having from one to six carbon atoms and an $\alpha$-olefin having 1 to 8 carbon atoms. Representative alkyl (meth)acrylates include methyl (meth)acrylate, ethyl (meth)acrylate, propyl (meth)acrylate, butyl (meth)acrylate, isobutyl (meth)acrylate, hexyl (meth)acrylate, or combinations of two or more thereof. Of note are ethyl acrylate and butyl acrylate. The $\alpha$-olefin may be selected from the group of propylene, octene, butene and hexane, especially propylene.

Modified ethylene copolymers can be modified with acid, anhydride and/or glycidyl (meth)acrylate functionalities.

Olefin homopolymers and/or copolymers and modified polymers are commercially available under the trademarks APPEEL®, BYNEL®, ELVALOY® AC and ELVAX® from DuPont.

Ethylene copolymers can be produced by any means known to one skilled in the art using either autoclave or tubular reactors (e.g. U.S. Pat. Nos. 3,404,134, 5,028,674, 6,500,888, 3,350,372, and 3,756,996).

The thickness of the tie layer of the multilayer structure may be between 1 and 100 µm, 5 and 50 µm, or 5 to 30 µm.

The coextruded multilayer film structure also comprises at least one to sealant layer. The sealant layer serves to adhere the film structure to any suitable substrate or to itself, and may comprises one or more olefin homopolymers and/or copolymers capable of fusion bonding on and to any suitable substrate or to itself by conventional means such as heat sealing.

The sealant layer may comprise olefin homopolymers and/or copolymers chosen among polyethylene, propylene homopolymers and/or copolymers, ethylene copolymers such as for example ethylene (meth)acrylic acid copolymers and their corresponding ionomers, and/or mixtures thereof.

The sealant layer may also include these homopolymers or copolymers blended with other polymers. For example, a polyethylene may be blended with polybutylene to provide a sealant with enhanced peelability.

Of note is a sealant layer comprising at least one ionomer such as disclosed above. In the multilayer structure, the ionomer in the sealant layer be the same as that in the puncture resistant layer or it may be different.

The multilayer film structure may further comprise at least one barrier layer and wherein said barrier layer is between the at least one puncture resistant layer and the at least one sealant layer, preferably wherein the barrier layer comprises ethylene vinyl alcohol copolymer (EVOH), COC, and blends thereof with polyethylene, polyvinyl alcohol and polyamides.

When the coextruded multilayer film structure comprises at least one barrier layer, such barrier layer may be chosen from layers comprising ethylene vinyl alcohol copolymer (EVOH), COC, and blends thereof with polyethylene, polyvinyl alcohol and polyamides, depending on the desired barrier effect (e.g. a moisture barrier and/or oxygen barrier). Such a barrier layer may be one or more layers combined.

The coextruded multilayer film structure may also comprise a barrier layer consisting of a layer of EVOH, which is adjacent to and between two layers comprising a polyamide or a COC or comprising a to blend of COC and polyethylene, polypropylene or ionomer. Stated alternatively, the coextruded multilayer film structure may also comprise a barrier layer consisting of a layer of EVOH flanked, on each side, by a layer comprising polyamide, COC, or a blend of COC and polyethylene, polypropylene or ionomer. In some embodiments, tie layer(s) may be present between the barrier layer and the layer comprising polyamide or COC or a blend of COC and polyethylene, polypropylene or ionomer. Accordingly, a preferred multilayer film structure is one wherein the at least one barrier layer consists essentially of a layer of ethylene vinyl alcohol copolymer between at least two layers each independently comprising a polyamide or a blend of cyclic olefin copolymer and polyethylene or polypropylene or ionomer.

A preferred embodiment is the multilayer structure wherein the at least one barrier layer consists of a layer of ethylene vinyl alcohol copolymer (EVOH) between two layers comprising a blend of cyclic olefin copolymer and ionomer, polyethylene or polypropylene, optionally with tie layers between the layer of EVOH and the layers comprising a blend of cyclic olefin copolymer and ionomer, polyethylene or polypropylene.

Another preferred embodiment is the multilayer structure wherein the at least one barrier layer consists of a layer of ethylene vinyl alcohol copolymer (EVOH) adjacent to and between two layers comprising a polyamide.

EVOH polymers generally have an ethylene content of between about 15 mole percent to about 60 mole percent, more preferably between about 20 to about 50 mole percent. The density of commercially available EVOH generally ranges from between about 1.12 g/cm$^3$ to about 1.20 gm/cm$^3$, the polymers having a melting temperature ranging from between about 142° C. and 191° C. EVOH polymers can be prepared by well-known techniques or can be obtained from commercial sources. EVOH copolymers may be prepared by saponifying or hydrolyzing ethylene vinyl acetate copolymers. Thus EVOH may also be known as hydrolyzed ethylene vinyl acetate (HEVA) copolymer. The degree of hydrolysis is preferably from about 50 to 100 mole percent, more to preferably from about 85 to 100 mole percent. In addition, the weight average molecular weight, $M_w$, of the EVOH component useful in the structures of the invention, calculated from the degree of polymerization and the molecular weight of the repeating unit, may be in the range of 5,000 Daltons to 300,000 Daltons with 50,000 to 70,000 Daltons, such as 60,000 Daltons, being most preferred.

Suitable EVOH polymers may be obtained from Eval Company of America or Kuraray Company of Japan under the tradename EVAL™. EVOH is also available under the tradename SOARNOL® from Noltex L.L.C. Examples of such EVOH resins include EVAL™ F101, EVAL™ E105, EVAL™ J102, and SOARNOL® DT2903, SOARNOL® DC3203 and SOARNOL® ET3803. Preferably the EVOH is orientable from about 3×3 to about 10×10 stretch without loss in barrier properties from pinholing, necking or breaks in the EVOH layer.

Of special note are EVOH resins sold under the tradename EVAL™ SP obtained from Eval Company of America or Kuraray Company of Japan that may be useful as components in the laminated shrink films of the present invention. EVAL™ SP is a type of EVOH that exhibits enhanced plasticity and that is suited for use in packaging applications including shrink film. Examples of such EVOH resins include EVAL™ SP 521, EVAL™ SP 292 and EVAL™ SP 482. The EVAL™ SP grades of EVOH are easier to orient than the conventional EVAL™ resins. These EVOH polymers are a preferred class for use in the multilayer oriented heat shrinkable films of this invention. Without being bound to theory, it is believed that the enhanced orientability of the EVAL™ SP EVOH resins derives from their chemical structure, in particular the relatively high level of head to head adjacent hydroxyl groups in the EVOH polymer chain. By head to head adjacent hydroxyl groups is meant 1,2-glycol structural units. By relatively high is meant from about 2 to about 8 mole % 1,2-glycol structural units are present in the EVOH polymer chain. Preferably, about 2.8 to about 5.2 mole % 1,2-glycol units will be present.

The barrier layer may comprise EVOH and be sandwiched between two puncture resistant layers, or stated alternatively, the at least one barrier layer is adjacent to and between the at least two puncture resistant to layers.

Accordingly, the multilayer film structure may comprise at least two puncture resistant layers comprising at least one cyclic olefin copolymer and at least one ionomer or polyolefin, preferably wherein the polyolefin is polyethylene or polypropylene; at least one barrier layer, wherein the at least one barrier layer is between the at least two puncture resistant layers; at least one tie layer; and at least one sealant layer.

The multilayer structure may further comprise an outer layer comprising a polyamide, polycarbonate, polyester, preferably polyethylene terephthalate, or polyolefin.

The outer layer may give the coextruded multilayer film structure mechanical resistance and/or printability, and/or may further comprise one or more additional functional layers such as barrier layers and/or other functional layers located between the at least one puncture resistant layer and the at least one sealant layer.

By outer layer it is meant a layer that is the outermost layer of the coextruded multilayer film structure, on the face opposite to that of the sealant layer, i.e. a layer forming the outer face of the structure on the face opposite to that of the sealant layer. For example, in a tubular coextruded structure such as that formed in a triple bubble process, the outer layer is the layer that serves as the exterior face of the tubular structure. In a package containing a product, the outer layer is the layer furthest from the product.

The outer layer may be chosen from polycondensates such as polyamides, polyesters and polycarbonates or from polyolefins.

Polyamides (abbreviated herein as PA), also referred to as nylons, are condensation products of one or more dicarboxylic acids and one or more diamines, and/or one or more aminocarboxylic acids such as 11-aminododecanoic acid, and/or ring-opening polymerization products of one or more cyclic lactams such as caprolactam and laurolactam. Polyamides may be fully aliphatic or semiaromatic.

Polyamides from single reactants such as lactams or amino acids, referred to as AB type polyamides are disclosed in *Nylon Plastics* (edited by Melvin L. Kohan, 1973, John Wiley and Sons, Inc.) and include nylon-6, to nylon-11, nylon-12, or combinations of two or more thereof. Polyamides prepared from more than one lactam or amino acid include nylon-6,12.

Other well-known polyamides useful as a component of the outer layer include those prepared from condensation of diamines and diacids, referred to as AABB type polyamides (including nylon-66, nylon-610, nylon-612, nylon-1010, and nylon-1212), as well as from a combination of lactams, diamines and diacids such as nylon-6/66, nylon-6/610, nylon-6/66/610, nylon-66/610, or combinations of two or more thereof.

Fully aliphatic polyamides used in the resin composition are formed from aliphatic and alicyclic monomers such as diamines, dicarboxylic acids, lactams, aminocarboxylic acids, and their reactive equivalents. In this context, the term "fully aliphatic polyamide" also refers to copolymers derived from two or more such monomers and blends of two or more fully aliphatic polyamides. Linear, branched, and cyclic monomers may be used.

Carboxylic acid monomers comprised in the fully aliphatic polyamides include, but are not limited to aliphatic dicarboxylic acids, such as for example adipic acid (C6), pimelic acid (C7), suberic acid (C8), azelaic acid (C9), decanedioic acid (C10), dodecanedioic acid (C12), tridecanedioic acid (C13), tetradecanedioic acid (C14), and pentadecanedioic acid (C15). Diamines can be chosen among diamines with four or more carbon atoms, including but not limited to tetramethylene diamine, hexamethylene diamine, octamethylene diamine, decamethylene diamine, dodecamethylene diamine, 2 methylpentamethylene diamine, 2-ethyltetramethylene diamine, 2 methyloctamethylenediamine; trimethylhexamethylenediamine, meta-xylylene diamine, and/or mixtures thereof.

Semi-aromatic polyamides include a homopolymer, a copolymer, a terpolymer or more advanced polymers formed from monomers containing aromatic groups. One or more aromatic carboxylic acids may be terephthalic acid or a mixture of terephthalic acid with one or more other carboxylic acids, such as isophthalic acid, phthalic acid, 2-methyl terephthalic acid and naphthalic acid. In addition, the one or more aromatic carboxylic acids may be mixed with one or more aliphatic dicarboxylic acids, as disclosed above. Alternatively, an aromatic diamine such as meta-xylylene diamine (MXD) can be used to provide a semi-aromatic polyamide, an example of which is MXD6, a homopolymer comprising MXD and adipic acid.

Preferred polyamides disclosed herein are homopolymers or copolymers wherein the term copolymer refers to polyamides that have two or more amide and/or diamide molecular repeat units. The homopolymers and copolymers are identified by their respective repeat units. For copolymers disclosed herein, the repeat units are listed in decreasing order of mole % repeat units present in the copolymer. The following list exemplifies the abbreviations used to identify monomers and repeat units in the homopolymer and copolymer polyamides:

HMD hexamethylene diamine (or 6 when used in combination with a diacid)
T Terephthalic acid
AA Adipic acid
DMD Decamethylenediamine
6 ε-Caprolactam
DDA Decanedioic acid
DDDA Dodecanedioic acid
I Isophthalic acid
MXD meta-xylylene diamine
TMD 1,4-tetramethylene diamine
4T polymer repeat unit formed from TMD and T
6T polymer repeat unit formed from HMD and T
DT polymer repeat unit formed from 2-MPMD and T
MXD6 polymer repeat unit formed from MXD and AA
66 polymer repeat unit formed from HMD and AA
10T polymer repeat unit formed from DMD and T
410 polymer repeat unit formed from TMD and DDA
510 polymer repeat unit formed from 1,5-pentanediamine and DDA
6 polymer repeat unit formed from ε-caprolactam
610 polymer repeat unit formed from HMD and DDA
612 polymer repeat unit formed from HMD and DDDA
11 polymer repeat unit formed from 11-aminoundecanoic acid
12 polymer repeat unit formed from 12-aminododecanoic acid In the art the term "6" when used alone designates a polymer repeat unit formed from ε-caprolactam. Alternatively "6" when used in combination with a diacid such as T, for instance 6T, the "6" refers to HMD. In repeat units comprising a diamine and diacid, the diamine is designated first. Furthermore, when "6" is used in combination with a diamine, for instance 66, the first "6" refers to the diamine HMD, and the second "6" refers to adipic acid. Likewise, repeat units derived from other amino acids or lactams are designated as single numbers designating the number of carbon atoms.

In various embodiments the polyamide composition comprises one or more polyamides selected from among the following groups (wherein PA is shorthand for polyamide or "nylon-"):

Group I polyamides may have semiaromatic repeat units to the extent that the melting point is less than 210° C. and generally the semiaromatic polyamides of the group have less than 40 mole percent of semiaromatic repeat units. Semiaromatic repeat units are defined as those derived from monomers selected from one or more of the group consisting of aromatic dicarboxylic acids having 8 to 20 carbon atoms and aliphatic diamines having 4 to 20 carbon atoms. Notable Group I polyamides include PA6/66, PA6/610, PA6/66/610, PA6/6T, PA1010, PA1 and PA12.

Group II polyamides have a melting point of at least 210° C., comprising an aliphatic polyamide such as poly(tetramethylene hexanediamide) (PA46), poly(ε-caprolactam) (PA6), poly(hexamethylene hexanediamide/(ε-caprolactam) (PA66/6), poly(hexamethylene hexanediamide) (PA66), poly(hexamethylene hexanediamide/hexamethylene decanediamide) (PA66/610), poly(hexamethylene hexanediamide/hexamethylene dodecanediamide) (PA66/612), poly(hexamethylene hexanediamide/decamethylene decanediamide) (PA66/1010), poly(hexamethylene decanediamide) (PA610), poly(hexamethylene dodecanediamide) (PA612), poly(hexamethylene tetradecanediamide) (PA614), poly (hexamethylene to hexadecanediamide) (PA616), and poly (tetramethylene hexanediamide/2-methylpentamethylene hexanediamide) (PA46/D6). Notable Group II polyamides include PA6, PA66, PA610 and PA612.

Group III polyamides have a melting point of at least 210° C. and comprise
(aa) 20 to 35 mole percent semiaromatic repeat units derived from one or more monomers selected from aromatic dicarboxylic acids having 8 to 20 carbon atoms and aliphatic diamines having 4 to 20 carbon atoms; and
(bb) 65 to 80 mole percent aliphatic repeat units derived from one or more monomers selected from aliphatic dicarboxylic acids having 6 to 20 carbon atoms and an aliphatic diamine having 4 to 20 carbon atoms; and lactams and/or aminocarboxylic acids having 4 to 20 carbon atoms. Group III polyamides include poly(tetramethylene hexanediamide/tetramethylene terephthalamide) (PA46/4T), poly(tetramethylene hexanediamide/hexamethylene terephthalamide) (PA46/6T), poly(tetramethylene hexanediamide/2-methylpentamethylene hexanediamide/decamethylene terephthalamide) PA46/D6/10T), poly(hexamethylene hexanediamide/hexamethylene terephthalamide) (PA66/6T), poly (hexamethylene hexanediamide/hexamethylene isophthalamide/hexamethylene terephthalamide PA66/6I/6T, and poly(hexamethylene hexanediamide/2-methylpentamethylene hexanediamide/hexamethylene terephthalamide (PA66/D6/6T). A preferred Group III polyamide is PA 66/6T.

Group IV polyamides have no melting point and include poly(hexamethylene isophthalamide/hexamethylene terephthalamide) (PA6I/6T) and poly(hexamethylene isophthalamide/hexamethylene terephthalamide/hexamethylene hexanediamide) (PA6I/6T/66).

In various embodiments the polyamide is a Group I polyamide, Group II polyamide, Group III polyamide, or Group IV polyamide, respectively.

Of note are polyamides with a lower ratio of methylene units to amide groups, especially those with a ratio of five or less methylene units per amide group such as PA6, PA66, PA6/66 and most especially PA6 and PA66. Also of note are polyamides with a ratio of methylene units to amide groups of 5 to 9 such as PA612, PA610, PA612, PA6/610, and PA6/66/610.

Preferred polyamides include PA6, PA66, PA610, PA612, PA6/66, PA6/610, PA6/66/610, PA6/6T, and combinations thereof. More preferred polyamides include PA6, PA66, PA610, PA612, and combinations thereof, with PA6 most preferred.

The polyamides may also be blends of two or more polyamides. Preferred blends include those selected from the group consisting of Group I and Group II polyamides, Group I and Group III polyamides, Group I and Group VI polyamides, Group II and Group III polyamides, Group II and Group IV polyamides.

Polyamides and processes for making them are well known to those skilled in the art, so the disclosure of which is omitted in the interest of brevity.

Suitable polyamides or copolymers thereof may be chosen among aliphatic or semi-aromatic polyamides including PA6, PA66, PA610, PA6T, PA6.66, PA10, PA11 or PA12. Of note is a blend of nylon-6 and nylon-66/610.

Suitable polyesters and copolymers thereof may be chosen among aliphatic polyesters such as polyhydroxyalkanoic acids like for example polylactic acid or poly(3-hydroxybutyrate) or among semi-aromatic polyesters like for example polyethylene terephthalate and copolymers thereof such as PETG, polytrimethylene terephthalate, polybutylene terephthalate and polyethylene naphthalate.

Polyesters and processes for making them are well known to those skilled in the art, so the disclosure of which is omitted in the interest of brevity.

Suitable polyolefins for use in the outer layer may be chosen from various types of polyethylene, polypropylene, polystyrene and ethylene copolymers, as described above.

Each layer of the coextruded multilayer film structure may independently further comprise, based on the weight of the layer, from about 0.0001 to about 20%, modifiers and other additives, including to without limitation, plasticizers, impact modifiers, stabilizers including viscosity stabilizers and hydrolytic stabilizers, lubricants, antioxidants, UV light stabilizers, antifog agents, antistatic agents, dyes, pigments or other coloring agents, fillers, flame retardant agents, reinforcing agents, grafting agents, foaming and blowing agents and processing aids known in the polymer compounding art; for example antiblock agents and release agents; and combinations of two or more thereof. These additives may be present in the polymer compositions of each of the layers independently in amounts of up to 20, such as 0.01 to 7, or 0.01 to 5, weight %.

Exemplary structures according to this invention may be the coextruded multilayer structures summarized below. In these structures, the layers are listed from left to right in order from outer layer (furthest away from the interior of the package or tubular structure) to inner layer (closest to the interior of the package or tubular structure). In these structures, outer layers include polyethylene terephthalate (PET) or polyamide (PA). Puncture-resistant layers include blends of cyclic olefin copolymer and ionomer (COC+IO), blends of cyclic olefin copolymer and polypropylene (COC+PP) and blends of cyclic olefin copolymer and polyethylene (COC+PE). A single layer barrier layer may be EVOH. Multilayer barrier layers include COC+PE/tie/EVOH/tie/COC+PE, COC+IO/tie/EVOH/tie/COC+IO, COC+PP/tie/EVOH/tie/COC+PP and PA/EVOH/PA. Sealant layers include polyethylene (PE), and ionomer (IO). Blends of polyethylene and polybutylene (PE+PB) provide sealant layers with easier peelability.

PET/tie/PE/COC+IO/tie/EVOH/tie/PE
PET/tie/PE/COC+PE/tie/EVOH/tie/PE
PET/tie/PE/COC+PP/tie/EVOH/tie/PE
PA/tie/P E/COC+IO/tie/EVOH/tie/P E
PA/tie/PE/COC+PE/tie/EVOH/tie/PE
PA/tie/PE/COC+PP/tie/EVOH/tie/PE
PET/tie/PE/COC+IO/tie/EVOH/tie/IO
PET/tie/PE/COC+PE/tie/EVOH/tie/IO
PET/tie/PE/COC+PP/tie/EVOH/tie/IO
PA/tie/PE/COC+IO/tie/EVOH/tie/IO
PA/tie/PE/COC+PE/tie/EVOH/tie/IO
PA/tie/PE/COC+PP/tie/EVOH/tie/IO
PET/tie/COC+IO/COC+PE/tie/EVOH/tie/PE
PET/tie/COC+IO/COC+PP/tie/EVOH/tie/PE
PET/tie/COC+PE/COC+IO/tie/EVOH/tie/PE
PET/tie/COC+PE/COC+PP/tie/EVOH/tie/PE
PET/tie/COC+PP/COC+IO/tie/EVOH/tie/PE
PET/tie/COC+PP/COC+PE/tie/EVOH/tie/PE
PET/tie/COC+IO/COC+PE/tie/EVOH/tie/PE
PET/tie/COC+IO/COC+PP/tie/EVOH/tie/IO
PET/tie/COC+PE/COC+IO/tie/EVOH/tie/IO
PET/tie/COC+PE/COC+PP/tie/EVOH/tie/IO
PET/tie/COC+PP/COC+IO/tie/EVOH/tie/IO
PET/tie/COC+PP/COC+PE/tie/EVOH/tie/IO
PET/tie/COC+IO/COC+PE/tie/EVOH/tie/COC+PE/tie/PE PET/tie/COC+PP/COC+PE/tie/EVOH/tie/COC+PE/PE
PET/tie/PP/COC+PP/tie/EVOH/tie/COC+PE/PE
PET/tie/PE/COC+PE/tie/EVOH/tie/COC+PE/PE
PET/tie/COC+IO/COC+PE/tie/EVOH/tie/COC+PE/COC+IO/IO
PET/tie/COC+PP/COC+PE/tie/EVOH/tie/COC+PE/COC+PP/IO
PET/tie/COC+IO/tie/PA/EVOH/PA/tie/PE
PET/tie/COC+PP/tie/PA/EVOH/PA/tie/PE
PET/tie/COC+IO/tie/PA/EVOH/PA/tie/PE
PET/tie/COC+IO/tie/PA/EVOH/PA/tie/IO
PET/tie/COC+PP/tie/PA/EVOH/PA/tie/IO
PET/tie/COC+IO/tie/PA/EVOH/PA/tie/IO
PET/tie/PP/COC+PP/tie/PA/EVOH/PA/tie/PE
PET/tie/PE/COC+PE/tie/PA/EVOH/PA/tie/PE
PET/tie/PP/COC+PP/tie/PA/EVOH/PA/tie/IO
PET/tie/PE/COC+PE/tie/PA/EVOH/PA/tie/IO
PET/tie/COC+PP/tie/PA/EVOH/PA/tie/COC+PP/IO
PET/tie/COC+PE/tie/PA/EVOH/PA/tie/COC+PE/IO
PET/tie/COC+IO/tie/PA/EVOH/PA/tie/COC+IO/IO
PET/tie/COC+PP/tie/PA/EVOH/PA/tie/COC+PP/IO
PET/tie/PE/PE+COC/tie/EVOH/tie/PE+COC/PE/PE+PB
PET/tie/PE/PE+COC/tie/EVOH/tie/PE+COC/PE/PE+PB
PET/tie/PE+COC/PE+COC/tie/EVOH/tie/PE+COC/PE/PE+PB
PET/tie/PE+COC/PE+COC/tie/PA/EVOH/PA/tie/PE/PE+PB
PET/tie/Ion/PE+COC/tie/EVOH/tie/PE+COC/PE/PE+PB
PET/tie/Ion+COC/PE+COC/tie/EVOH/tie/PE+COC/PE/PE+PB
PET/tie/PP/PP+COC/tie/EVOH/tie/PE+COC/PE/PE+PB
PET/tie/PP+COC/PE+COC/tie/EVOH/tie/PE+COC/PE+PB
PET/tie/PP+COC/PE+COC/tie/PA/EVOH/PA/tie/PE+COC/PE+PB
PET/tie/PP+COC/PE+COC/tie/PA/EVOH/PA/tie/PE/PE+PB.

In particular embodiments, the ionomer sealant layer and the COC+IO, COC+PE or the COC+PP layer may further enhance the puncture resistance and shrinking ability and reduce the tendency of the coextruded multilayer film structure to curl.

A preferred film structure comprises the layers of PET/tie/puncture resistant layer/COC+PE/tie/EVOH/tie/COC+PE/tie/PE wherein PET represents a polyethylene terephthalate outer layer, the puncture resistant layer comprises a blend of cyclic olefin copolymer and ionomer or cyclic olefin copolymer and polypropylene, the barrier layer comprises COC+PE/tie/EVOH/tie/COC+PE, and PE represents a polyethylene sealant layer.

Another preferred film structure comprises the layers of PET/tie/puncture resistant layer/COC+PE/tie/EVOH/tie/COC+PE/puncture resistant layer/IO wherein PET represents a polyethylene terephthalate outer layer, each puncture resistant layer independently comprises a blend of cyclic olefin copolymer and ionomer or cyclic olefin copolymer and polypropylene, the COC+PE/tie/EVOH/tie/COC+PE is a barrier layer structure, and IO represents an ionomer sealant layer.

The inventors surprisingly discovered that it is possible to produce the coextruded multilayer structure by coextrusion and/or orientation by a triple bubble process. The process can comprise coextruding at least one puncture resistant layer, at least one tie layer, and at least one sealant layer to produce a tubular coextruded multilayer film; cooling the to coextruded tubular multilayer film structure in a first bubble;

orienting (e.g., mono- or bi-axially) the coextruded tubular multilayer film structure under heating in a second bubble; and relaxing the oriented coextruded tubular multilayer film structure under heating in a third bubble.

In the triple bubble process, the tubular coextruded multilayer film structure can be heated in the second bubble to a temperature between the glass transition temperature of the at least one puncture resistant layer and the melting point of the at least one puncture resistant layer, such as to a temperature of from 60 to 95° C., or 75 to 95° C.

In the process, the tubular coextruded multilayer film structure can be heated in the third bubble to a temperature between the glass transition temperature of the puncture resistant layer and the melting point of the puncture resistant layer, to a temperature that is inferior to the temperature in the second bubble, or the coextruded multilayer film structure can be heated in the third bubble to a temperature of from 65 to 95° C., or 75 to 95° C., or in the cases of LLDPE to temperatures of 95 to 125° C., or PP to temperatures of 95 to 136° C.

This triple bubble process may allow for the manufacture of coextruded multilayer film structures comprising at least one puncture resistant layer having excellent barrier properties as well as good mechanical properties, excellent heat shrink performance and transparency.

The step of coextruding the puncture resistant layer, tie layer and sealant layer may be carried out by connecting multiple feeders processing the corresponding materials, generally in the form of granulates, to extruders connected to a circular or annular die to form a tubular multilayer film in a manner known in the art.

The COC and at least one ionomer or polyolefin of the puncture resistant layer can be fed into the extruder in the form of a "salt and pepper blend" by methods known in the art such as to form the corresponding layer in the tubular coextruded multilayer film.

The polymers making up the tie layer and making up the sealant layer can be fed into the extruder by methods known in the art such as to form corresponding layers in the tubular coextruded multilayer film to structure.

In the case in which the coextruded multilayer film comprises an outer layer giving the coextruded multilayer film structure mechanical resistance and/or printability, or comprises one or more additional functional layers such as barrier layers and/or other functional layers, the corresponding materials can be fed, in a manner known in the art, into the extruder by connecting additional feeders to it and redirecting the melt into the desired areas of the circular or annular die.

Figure 1:
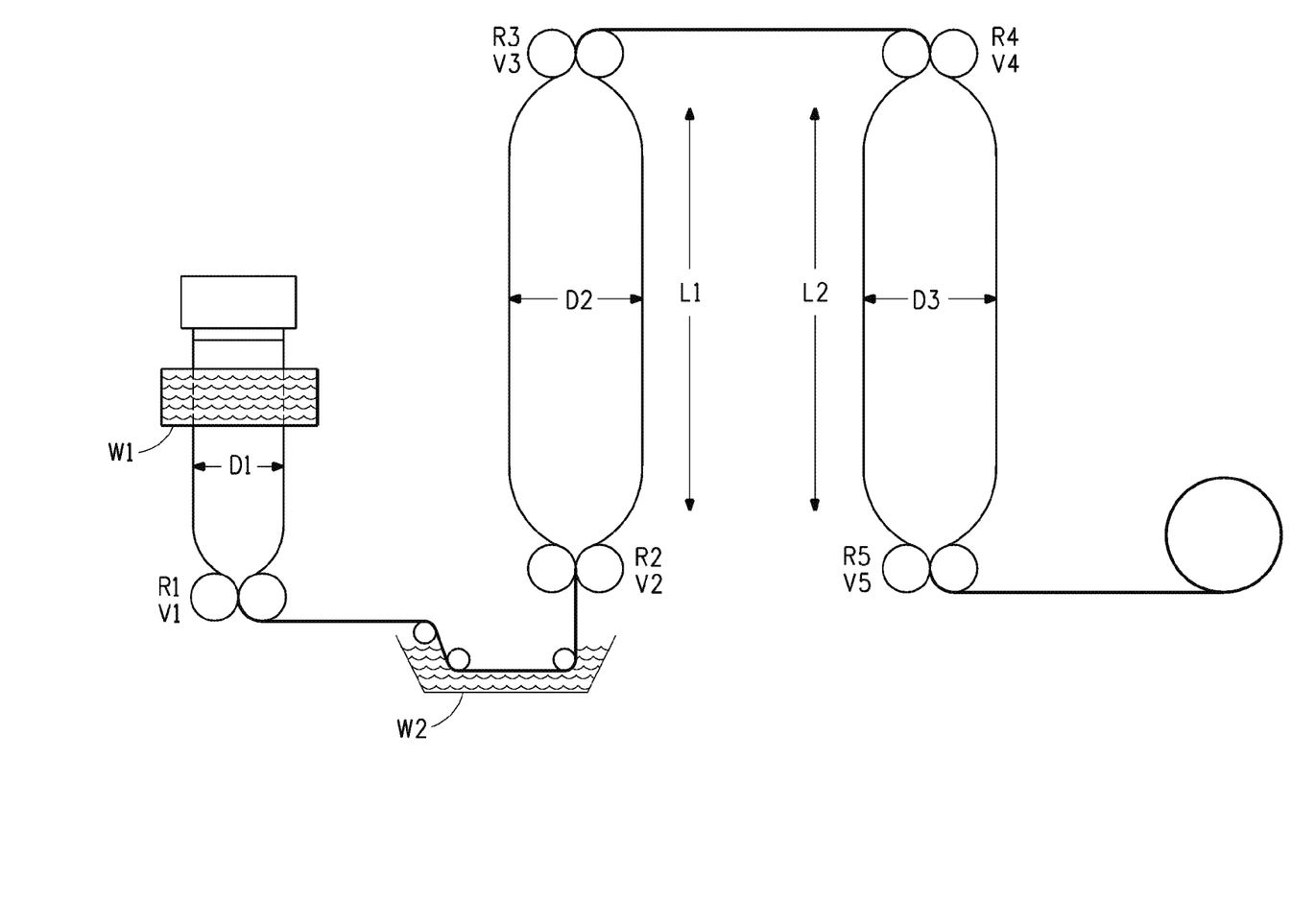
FIG. 1 shows a schematic overview of the triple bubble process of the invention, as described below.

Referring to FIG. 1, a schematic diagram of the triple bubble process is presented. The first bubble B1 is formed on one end by the tubular multilayer film structure having a diameter of D1 exiting the circular or annular die of the extruder, and on the other end by the set of rolls R1 that form the hermetically closed end of the first bubble B1.

In the first bubble B1, the tubular multilayer film exiting the die and having an initial diameter D1, is quickly cooled, or quenched, in a way such as to obtain a minimum amount of crystallization in the structure.

Said quick cooling, or quenching, is preferably obtained by quenching the exiting tubular coextruded multilayer film through a first water bath W1 having a temperature of from 0.1° C. to 50° C., more preferably of from 0.1° C. to 25° C. and a length of from 0.4 to 5 m, preferably of from 1 to 3 m. The residence time in the water bath W1 may be adjusted to range of from 1 to 20 seconds, more preferably from 10 to 20 seconds.

After cooling, the now solidified tubular coextruded multilayer film structure is then passed through a set of rolls which are immersed in a second water bath W2 having a temperature of from 60 to 95° C. The second water bath has a variable length of from 0.4 to 5 meters and the residence time in this bath depending on the speed of the film line can be from 1 to 20 seconds, more preferably from 10 to 20 seconds.

The second water bath W2 pre-heats the solidified tubular coextruded multilayer film passing through to a temperature where it can be stretched without ripping, of more than 60° C., preferably from 60° C. to 95° C., more preferably from 75° C. and 95° C. In more general terms, the solidified tubular coextruded multilayer film is heated to a temperature to above the glass transition temperature of the layer having the highest glass transition temperature, which in the case of the present invention is the at least one puncture resistant layer.

The second water bath W2 may be replaced by or supplemented with any suitable heating means, such as for example a hot air blower, an IR heater or heating coils. In the case where the second water bath W2 is supplemented by a hot air blower, the hot air blower may be set to a temperature of from 140 to 160° C., which will heat the tubular coextruded multilayer film to a temperature of from 75° C. to 95° C. because of the low heat capacity of air, and the hot air blower is preferably located immediately after the second set of nip rolls R2 sealing the upstream (towards the extruder) end of the second bubble.

After being pre-heated in the second water bath W2, the now softened tubular coextruded multilayer film structure is inflated to form the second bubble. Forming the softened tubular coextruded multilayer film structure allows for the structure to be oriented by drawing in both machine/axial direction (MD) and transverse/radial direction (TD) in the second bubble B2, at the same time.

The drawing in the machine/axial direction (MD) can be achieved by adjusting the speed V2 of a second set of nip rolls R2 that form the upstream (towards the extruder) end of the second bubble and the speed V3 of a third set of nip rolls R3 that form the downstream (away from extruder) end of the second bubble. Generally, V3 is greater than V2, preferably 2 to 4 times greater than V2. Stated alternatively, the ratio given by V3N2 is equivalent to the drawing ratio and is preferably of from 2 to 4.

The drawing in the transverse/radial direction (TD) can be achieved by adjusting the pressure P1 within the second bubble B2. To adjust the pressure P1, the distance L1 between a first set of nip rolls R2 that form the hermetically closed upstream (towards the extruder) end of the second bubble B2, and a second set of nip rolls R3 that form the hermetically closed downstream (away from extruder) end of the second bubble B2 can be adjusted. Reducing the distance L1 between the two sets of nip rolls to (R2 and R3) will increase the pressure P1, whereas increasing the distance L1 will lower the pressure P1 within the second bubble. After drawing in the transverse/radial direction (TD), the initial diameter D1 of the softened tubular coextruded multilayer film structure can be increased to a diameter D2, wherein the ratio between D2 and D1 is of from 2 to 5, preferably of from 2.5 to 3.5.

While passing through the third set of nip rolls R3, the drawn tubular coextruded multilayer film structure is flattened to be more easily conveyed.

After passing through the set of nip rolls R3, the tubular coextruded multilayer film structure is passed through a fourth set of nip rolls R4 that form the hermetically closed upstream (towards the extruder) end of the third bubble B3, and a fifth set of nip rolls R5 that form the hermetically closed downstream (away from extruder) end of the third bubble B3.

The fourth and fifth set of nip rolls (R4 and R5) are separated by a distance L2 that can be adjusted to increase or decrease the pressure P2 within the third bubble B3 in order to allow the previously drawn tubular coextruded multilayer film structure to relax in transverse/radial direction (TD).

Generally, this can be achieved by adjusting the pressure P2 in the third bubble B3 such that the pressure P2 is lesser than the pressure P1. The pressure is adjusted by modifying the distance L2 between the fourth and the fifth set of nip rolls (R4 and R5) of the third bubble B3, which pressure adjustment may modify the diameter D3. The relaxation ratio is given by the ratio of D3/D2, whereas D3 is usually lesser than D2 and concurrently the ratio of D3/D2 is smaller than 1. Typically the ratio of D3/D2 can be of from 0.8 and 0.95, more preferably between 0.85 and 0.9.

The speed V4 of the fourth set of nip rolls R4 and the speed V5 of the fifth set of nip rolls may be adjusted in order to allow the previously drawn tubular coextruded multilayer film to relax in machine/axial direction (MD).

Generally, this can be achieved by adjusting the speed V5 of the fifth set of nip rolls R5 such that V5 is lesser than V4. The relaxation ratio to is given by V5N4, whereas V5 is usually lesser than V4 and concurrently the ratio of V5N4 is smaller than 1. Typically the ratio of V5N4 can be of from 0.8 to 0.95, more preferably of from 0.85 to 0.9.

The temperature of the coextruded multilayer film structure in the third bubble, the pressure P2 and the ratio of V5N4 may be adjusted individually or in parallel to achieve a tubular coextruded multilayer film exhibiting a thermal shrink ranging of from 1 to 60 percent, more preferably of from 30 to 60 percent, in machine/axial direction (MD) and/or transverse/radial direction (TD), when measured by immersion of a sample into a water bath at a temperature of 85° C. for 10 seconds.

The tubular multilayer film is relaxed in the third bubble B3 under heating. In order to keep the tubular multilayer film at a temperature of between the glass transition temperature of the at least one puncture resistant layer and the melting point of the at least one puncture resistant layer in the second bubble, an appropriate heating means may be used, such as an IR heater, steam or heated air heater.

Preferably, the temperature of the coextruded multilayer film structure in the third bubble B3 is lower than in the second bubble with the proviso of being between the glass transition temperature of the at least one puncture resistant layer and the melting point of the at least one puncture resistant layer.

After passing through the fifth set of nip rolls R5, the tubular coextruded multilayer film is passed through a set of rolls, flattened and stored on a roll S.

Optionally, the tubular coextruded multilayer film exiting the fifth set of nip rolls R5 can be slit on one side by a slitting knife K to yield a planar coextruded multilayer film that can be stored on a roll S.

The above process provides for the manufacture of a coextruded multilayer film comprising at least one, preferably mono- or bi-axially oriented, puncture resistant layer, at least one tie layer and at least one sealant layer.

The coextruded multilayer film structure may be used in particular in packaging applications such as in the manufacture of shrink bags, but may to also be used in non-packaging applications such as for example, manufacture of tapes or textiles for building, landscaping, or garment applications.

The invention further provides for a packaging article comprising a coextruded multilayer film structure comprising at least one of mono- or bi-axially oriented puncture resistant layer, at least one tie layer and at least one sealant layer. In particular, the packaging article may be used for the packaging of food ingredients having sharp, pointed and/or cutting edges such as for example coffee, rice, meat containing bone or bone splinters, or dry noodles.

The coextruded multilayer film structure may be used in the packaging article as a lidding film or as a shrink film.

EXAMPLES

Materials used in the Examples set forth below are as follows, identified by the respective trademarks and trade designations. PET: polyethylene terephthalate polyester, commercially available as Lighter C93 from Lighter.

Tie1: ethylene acrylate copolymer, melt flow rate (MFR, determined according to ASTM D 1238 at 190° C./2.16 kg) of 2, commercially available as Bynel® 22E780 from DuPont.

Tie2: LLDPE modified (grafted) with maleic anhydride, commercially available as Bynel® 41 E850 from DuPont.

Tie3: maleic anhydride grafted polyolefin commercially available as Admer™ SF730.

PE: low density polyethylene commercially available as LDPE 2420F, from Dow Chemical Company.

COC: a COC copolymer of ethylene and norbornene with a MFR (according to ASTM D 1238 at 230° C./2.16 kg) of 6 and a glass transition temperature (Tg) of 65° C., commercially available as Topas® 9506F-500 from TICONA.

PA: nylon-6, commercially available as Grilamid® F40 from EMS Chemie.

CoPA: nylon-66/610 copolymer commercially available as Grilon® G 20 from EMS Chemie.

CoPP: polypropylene copolymer commercially available as Adsyl® 6C30F from Lyon-Bassell.

EVOH: ethylene vinyl alcohol copolymer commercially available under the designation SP2904, from EVAL.

ION1: copolymer of ethylene with 15% methacrylic acid and a melt flow index (MFI) of 0.7, 58% neutralized with Zn.

mPE: a metallocene catalyzed ethylene-hexene copolymer, commercially available under the designation Exceed™ 2018 from ExxonMobil Chemical AB: silicon dioxide antiblock masterbatch containing about 10 weight % silicon dioxide.

Multilayer blown films as summarized in Table 1 and 2 can be prepared on a triple bubble blown film machine manufactured by Kuhne Anlagenbau equipped with 11 extruders with gear pumps and screws with defined but different length/diameter ratios for different materials. The compositions for each of the layers as summarized in Tables 1 and 2 were fed to the respective extruders of the triple bubble extruder. This was a The materials were fed from separate feeders into separate extruders and coextruded through an annular die to provide coextruded multilayer films. The extruders were operated with temperature profiles as follows for the materials used in the layers.

| Material | Feed zone to final zone (left to right) |
|---|---|
| PET | 230-260-260-260-260-260-280-280° C. |
| Polyolefins and COCs | 185-195-220-220-220-220-220-220° C. |
| PA | 250-250-250-250-250-250-250-250° C. |
| EVOH | 175-195-200-200-200-200-200-200° C. |

The final temperature of the melt in the die was between 250 and 260° C.

A typical blown packaging film was prepared and is summarized in Table 1 as Comparative Example C1. This structure contained a polypropylene copolymer core without a barrier layer or a puncture resistant layer.

TABLE 1

| Layer (outside to inside) | Feed Ratio (% of total) | Nominal Thickness (micrometers) | Comparative Example C2 Composition |
|---|---|---|---|
| 1 | 10 | 6.4 | 98 PET/2 AB |
| 2 | 7 | 4.5 | Tie3 |
| 3 | 28 | 17.9 | CoPP |
| 4 | 4 | 2.6 | CoPP |
| 5 | 5 | 3.2 | CoPP |
| 6 | 8 | 5.1 | CoPP |
| 7 | 6 | 3.8 | CoPP |
| 8 | 8 | 5.1 | CoPP |
| 9 | 5 | 3.2 | CoPP |
| 10 | 4 | 2.6 | Tie3 |
| 11 | 15 | 9.6 | 97 ION1/3 AB |
| Puncture Resistance (J/mm) | | 1.1-1.4 | |

This film had a relatively low puncture resistance.

Structures containing barrier layers are shown in Table 2. Example 1, a film of the invention, has an identical structure to Comparative Example C2 except that a polyethylene-COC blend, a puncture-resistant composition, was used in place of polyethylene in layers 3 and 4. The extruders were set up to run with the following output relationship: 7/7/30/6/5/8/6/8/5/3/15 (in %).

TABLE 2

| Layer (outside to inside) | Nominal Thickness (micrometers) | Comparative Example C2 Composition | Example 1 Composition |
|---|---|---|---|
| 1 | 3 | 98 PET/2 AB | 98 PET/2 AB |
| 2 | 3 | Tie1 | Tie1 |
| 3 | 12.6 | PE | 80 PE/20 COC |
| 4 | 2.5 | PE | 80 PE/20 COC |
| 5 | 2.1 | Tie2 | Tie2 |
| 6 | 3.4 | 80 PA/20 CoPA | 80 PA/20 CoPA |
| 7 | 2.5 | EVOH | EVOH |
| 8 | 3.4 | 80 PA/20 CoPA | 80 PA/20 CoPA |
| 9 | 2.1 | Tie2 | Tie2 |
| 10 | 1.2 | 80 PE/20 mPE | 80 PE/20 mPE |
| 11 | 6.3 | 72 PE/15 mPE/ 10 PB/3 AB | 72 PE/15 mPE/ 10 PB/3 AB |
| Punctures Resistance (J/mm) | | — | 2.2 |

The resultant films were tested for puncture resistance according to a DIN14477 or EN388 test at a speed of 1 mm/min using a rod bearing a spherical ball at its tip, the rod having a diameter of 2 mm and the spherical ball having a diameter of 2.5 mm. In these tests the rod was placed in contact with the inside layer (layer 11). The results are shown in Tables 1 and 2. Example 1 had good puncture resistance.

The invention claimed is:

1. A coextruded multilayer film structure comprising, in order,
   at least one puncture resistant layer comprising at least one cyclic olefin copolymer and at least one ionomer or polyolefin;
   at least one tie layer;
   at least one barrier layer consisting essentially of a layer of ethylene vinyl alcohol copolymer (EVOH) between at least two layers each independently comprising a polyamide, a cyclic olefin copolymer or a blend of cyclic olefin copolymer and polyethylene or polypropylene or ionomer;
   at least a second tie layer;
   at least a second puncture resistant layer comprising at least one cyclic olefin copolymer and at least one ionomer or polyolefin; and
   at least one sealant layer;
   wherein the film is either monoaxially oriented or biaxially oriented.

2. The multilayer film structure according to claim 1 wherein the film structure has a puncture resistance of at least 2 J/mm, wherein the puncture resistance is measured according to DIN14477 at a speed of 1 mm/min using a rod bearing a spherical ball at its tip, the rod having a diameter of 2 mm and the spherical ball having a diameter of 2.5 mm.

3. The multilayer film structure according to claim 1 wherein the at least one puncture resistant layer comprises at least one cyclic olefin copolymer and at least one ionomer, at least one cyclic olefin copolymer and polyethylene, or at least one cyclic olefin copolymer and polypropylene, the tie layer comprises olefin homopolymers or copolymers, or ethylene copolymers; and the sealant layer comprises olefin homopolymers and/or copolymers chosen from among polyethylene, propylene homopolymers and copolymers, ethylene copolymers, or mixtures thereof.

4. The multilayer film structure according to claim 1 prepared by a triple bubble process.

5. The multilayer film structure according to claim 1 wherein the at least one barrier layer consists essentially of a layer of ethylene vinyl alcohol copolymer between at least two layers each independently comprising a polyamide or a blend of cyclic olefin copolymer and polyethylene or polypropylene or ionomer.

6. The structure according to claim 1, wherein the at least one barrier layer consists of a layer of EVOH between two layers comprising a blend of cyclic olefin copolymer and ionomer, polyethylene or polypropylene, optionally with tie layers between the layer of EVOH and the layers comprising a blend of cyclic olefin copolymer and ionomer, polyethylene or polypropylene.

7. The structure according to claim 1, wherein the at least one barrier layer consists of a layer of ethylene vinyl alcohol copolymer adjacent to and between two layers comprising a polyamide.

8. The structure according to claim 1 further comprising an outer layer comprising a polyamide, polycarbonate, polyester, or polyolefin.

9. The structure according to claim 1, wherein the puncture resistant layer comprises from 10 to 99 weight percent of the at least one cyclic olefin copolymer, based on the total weight of the puncture resistant layer.

10. A packaging article comprising a coextruded multilayer film structure as characterized in claim 1.

11. The multilayer film structure according to claim 2 wherein the film structure has a puncture resistance from 2 to 10 J/mm.

12. The multilayer film structure according to claim 3 wherein the olefin homopolymers or copolymers comprise polyethylene homopolymers or copolymers, propylene homopolymers or copolymers, and the ethylene copolymers comprise ethylene α-olefin copolymers, ethylene vinyl acetate copolymers, ethylene alkyl (meth)acrylate copolymers, or polymers or copolymers modified with acid, anhydride or epoxide functionalities.

13. The multilayer film structure according to claim 3 wherein the sealant layer comprises an ethylene (meth)acrylic acid copolymer or ionomer thereof.

14. The multilayer film structure according to claim 3 wherein the at least one barrier layer consists essentially of a layer of ethylene vinyl alcohol copolymer between at least two layers each independently comprising a polyamide or a blend of cyclic olefin copolymer and polyethylene or polypropylene or ionomer.

15. The multilayer film structure according to claim 3 wherein the at least one barrier layer consists of a layer of EVOH between two layers comprising a blend of cyclic olefin copolymer and ionomer, polyethylene or polypropylene, optionally with tie layers between the layer of EVOH and the layers comprising a blend of cyclic olefin copolymer and ionomer, polyethylene or polypropylene.

16. The multilayer film structure according to claim 3 wherein the at least one barrier layer consists of a layer of ethylene vinyl alcohol copolymer adjacent to and between two layers comprising a polyamide.

17. The multilayer film structure according to claim 3 further comprising an outer layer comprising a polyamide, polycarbonate, polyester, or polyolefin.

18. The multilayer film structure according to claim 3 wherein the polyolefin comprises a polyethylene homopolymer, polyethylene copolymer, polypropylene homopolymer or polypropylene copolymer.

19. The multilayer film structure according to claim 3 wherein the at least one tie layer comprises polyethylene homopolymers or copolymers, propylene homopolymers or copolymers, ethylene vinyl acetate copolymers, ethylene alkyl (meth)acrylate copolymers, or polymers or copolymers modified with acid, anhydride or epoxide functionalities; and the sealant layer comprises an ethylene (meth)acrylic acid copolymer or ionomer thereof.

20. A process for manufacturing a coextruded multilayer film structure, said coextruded multilayer film structure comprising, in order,
    at least one puncture resistant layer comprising at least one cyclic olefin copolymer and at least one ionomer or polyolefin;
    at least one tie layer;
    at least one barrier layer consisting essentially of a layer of ethylene vinyl alcohol copolymer (EVOH) between at least two layers each independently comprising a polyamide, a cyclic olefin copolymer or a blend of cyclic olefin copolymer and polyethylene or polypropylene or ionomer; and
    at least one sealant layer;
    wherein the coextruded multilayer film structure is either monoaxially oriented or biaxially oriented;
    said process comprising the steps of:
    coextruding a multilayer film structure to a coextruded tubular film;
    cooling the coextruded tubular film in a first bubble;
    orienting the coextruded tubular film under heating in a second bubble to produce an oriented film; and
    relaxing the oriented film under heating in a third bubble.

21. The process of claim 20 wherein the oriented film is either mono-axially oriented or biaxially oriented.

* * * * *